US008457466B1

(12) United States Patent
Sharma et al.

(10) Patent No.: US 8,457,466 B1
(45) Date of Patent: Jun. 4, 2013

(54) VIDEORE: METHOD AND SYSTEM FOR STORING VIDEOS FROM MULTIPLE CAMERAS FOR BEHAVIOR RE-MINING

(75) Inventors: Rajeev Sharma, State College, PA (US); Namsoon Jung, State College, PA (US)

(73) Assignee: VideoMining Corporation, State College, PA (US)

( * ) Notice: Subject to any disclaimer, the term of this patent is extended or adjusted under 35 U.S.C. 154(b) by 1091 days.

(21) Appl. No.: 12/286,138

(22) Filed: Sep. 29, 2008

(51) Int. Cl.
*H04N 5/772* (2006.01)
(52) U.S. Cl.
USPC .............................. 386/224; 705/10; 386/124
(58) Field of Classification Search
USPC ..................................................... 386/46, 224
See application file for complete search history.

(56) References Cited

U.S. PATENT DOCUMENTS

| 6,496,856 B1 | 12/2002 | Kenner et al. |
| 7,383,508 B2 | 6/2008 | Toyama et al. |
| 7,760,230 B2 * | 7/2010 | Russell et al. ................ 348/143 |
| 2005/0271251 A1 | 12/2005 | Russell et al. |

OTHER PUBLICATIONS

"Annotation Guidelines for Video Analysis and Content Extraction (VACE-II)" (Jan. 25, 2006) by Harish Raju et al.; 33 pages; originally downloaded from http://clear-evaluation.org/downloads/Annotation_Guidelines_Version_6.2-1.pdf.*
"VideoMining—The Power to See More" (Feb. 9, 2007) by VideoMining; Asignee Website (8 pages total); converted to PDF originally from http://www.videomining.com/ via http://www.archive.org/.*
U.S. Appl. No. 11/805,231, Sharma et al.
U.S. Appl. No. 11/999,649, Jung, et al.
U.S. Appl. No. 12/011,650, Mummareddy, et al.
Chen, X., et al., "Interactive mining and semantic retrieval of videos," in Proc. of 8th Int'l Workshop on Multimedia Data Mining, Aug. 12, 2007, pp. 1-9, New York, NY.
Jiang, H., et al., "Spatial and temporal content-based access to hypervideo databases," VLDB Journal 7, Dec. 4, 1998, pp. 226-238, Chicago, IL.

(Continued)

*Primary Examiner* — Peter Shaw
*Assistant Examiner* — Dao Ho

(57) ABSTRACT

The present invention is a method and system for storing videos by track sequences and selection of video segments in a manner to support "re-mining" by indexing and playback of individual visitors' entire trip to an area covered by overlapping cameras, allowing analysis and recognition of detailed behavior. The present invention captures video streams of the people in the area by multiple cameras and tracks the people in each of the video streams, producing track sequences in each video stream. Using the track sequences, the present invention finds trip information of the people. The present invention determines a first set of video segments that contain the trip information of the people, and compacts each of the video streams by removing a second set of video segments that do not contain the trip information of the people from each of the video streams. The video segments in the first set of video segments are associated with the people by indexing the video segments per person based on the trip information. The final storage format of the videos is a trip-centered format which sequences videos from across multiple cameras in a manner to facilitate multiple applications dealing with behavior analysis, and it is an efficient compact format without losing any video segments that contain the track sequences of the people.

16 Claims, 13 Drawing Sheets

OTHER PUBLICATIONS

Mongy, S., et al., "Analyzing user's behavior on a video database," in Proc. of 6th Int'l Workshop on Multimedia Data Mining, Aug. 21, 2005, pp. 95-100, New York, NY.

Yi, H., et al., "A motion based scene tree for browsing and retrieval of compressed videos," in Proc. of 2nd ACM Int'l Workshop on Multimedia Databases, Nov. 13, 2004, pp. 10-18.

* cited by examiner

| VIDEO SEGMENT | VIDEO STREAM ID | START TIME | FINISH TIME |
|---|---|---|---|
| SG1-1 | C1 | T1 | T2 |
| SG3-1 | C3 | T1 | T2 |
| SG2-1 | C2 | T2 | T4 |
| SG1-2 | C1 | T3 | T5 |
| SG3-2 | C3 | T3 | T6 |
| SGn-1 | Cn | T5 | T7 |
| SG1-3 | C1 | T6 | T9 |
| SG2-2 | C2 | T7 | T8 |
| SG3-3 | C3 | T9 | T11 |
| SG1-4 | C1 | T10 | T12 |
| ⋮ | ⋮ | ⋮ | ⋮ |

LOOKUP TABLE FOR VIDEO SEGMENTS, IN WHICH PEOPLE ARE DETECTED.
THE ROW DATA ARE ORDERED BY "START TIME", THEN "FINISH TIME" BASED ON GREEDY ALGORITHM.

Fig. 5

VIDEORE: METHOD AND SYSTEM FOR STORING VIDEOS FROM MULTIPLE CAMERAS FOR BEHAVIOR RE-MINING

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of the Invention

The present invention is a method and system for storing videos by track sequences and selection of video segments by indexing and playback of individual visitors' entire trip to an area covered by the overlapping cameras, wherein the final storage format of the videos is a trip-centered format, which sequences videos from across multiple cameras in a manner to facilitate multiple applications dealing with detailed behavior analysis, and an efficient compact format without losing any video segments that contain the track sequences of the people.

2. Background of the Invention

In the video analysis areas, especially in the video-based behavior analysis application areas, the need for a novel method of efficient video storage and access has been shown.

For example, Mongy, S., Bouali, F., and Djeraba, C. 2005. Analyzing user's behavior on a video database, in the Proceedings of the 6th International Workshop on Multimedia Data Mining: Mining integrated Media and Complex Data (Chicago, Ill., Aug. 21-21, 2005). MDM '05. ACM, New York, N.Y., 95-100, (hereinafter Mongy) addresses the need for an intelligent software system that fully utilizes information in users' behavior in interacting with large video databases. Mongy disclosed a framework that combines intra-video and inter-video usage mining to generate a user profile on a video search engine for video usage mining.

However, it needs to be clearly discerned that the topics in Mongy are not for mining the video content itself, but rather for mining the usage of videos by users, i.e., video usage behavior analysis. Therefore, Mongy is entirely foreign to the idea of how to create an efficient video storage, especially based on track sequences of people or moving objects in multiple video streams, in order to facilitate the behavior analysis of the people and moving objects in the video streams.

U.S. Pat. No. 7,383,508 of Toyama, et al. (hereinafter Toyama) disclosed a method of a video abstraction system for displaying short segments of video called a cliplet that represents a single theme or event. The cliplet is a semantically meaningful portion of video containing what a viewer might consider a single short event. The cliplet commonly consists of 3 to 10 seconds of partial source video. A boring and uninteresting section of the source may be excluded altogether. Toyama attaches the properties that can be obtained by voice or speaker recognition, face detection, and zoom or pan detections to each cliplet. The properties then help a user to find a specific cliplet. The computer user interface displays the cliplet and the information and properties of each cliplet.

Toyama is basically for providing a more efficient method of editing the source video data. The cliplet is for fast reviewing of the source video data, so that it can help the user to edit the video data easily. In Toyama, there is no source video modification. Toyama also did not explicitly teach how to connect multiple cliplets in a sequence based on the tracking of people or moving objects. Toyama is foreign to the idea of tracking the individual object in video data.

Toyama is further foreign to the idea of distinguishing the video segments that show track sequences of people or moving objects from the other video segments that do not contain such track sequences. Toyama also explicitly teaches the usage of a constraint application module that limits the minimum and maximum duration of a cliplet, whereas there is no such time constraint for the trip video segments in the present invention. Toyama is also entirely foreign to the idea of creating a collage of video segments from multiple video streams based on a tracking of people or moving objects in the video streams, where each video segment is just a part of a single or multiple events.

U.S. Patent Application Publication No. 2005/0271251 of Russell, et al. (hereinafter Russell) disclosed a method of managing video data storage in a video surveillance system. Russell tried to determine the importance of video data based on decision criteria, such as rules, configuration data and preference, to support intelligent automatic reduction of stored surveillance data. Russell deleted, compressed, or archived the images and video data that are determined as less important. A decision criterion includes specific object recognition or event detecting. Russell mentioned a human detection as a case of event detection. Additionally, Russell stored the event metadata at an event database. This metadata may include event information such as time, location, type of event and potentially an identification of a person or object.

However, Russell did not use event metadata for making tracking sequences of an object in order to facilitate behavioral pattern analysis of each object like the present invention. Furthermore, Russell is foreign to the idea of compacting video segments based on the trip information of the people or moving objects and creating a compact video stream out of multiple video streams in the way the present invention teaches.

Therefore, it is one of the objectives of the present invention to provide a novel video format that creates a collage of video segments from multiple video streams, based on a tracking of people or moving objects in the video streams, in order to facilitate video annotation or editing for behavior analysis.

Yi, H., Rajan, D., and Chia, L. 2004. A motion based scene tree for browsing and retrieval of compressed videos. In Proceedings of the 2nd ACM international Workshop on Multimedia Databases (Washington, D.C., USA, Nov. 13-13, 2004). MMDB '04. ACM, New York, N.Y., 10-18, (hereinafter Yi) disclosed a method for browsing and retrieving compressed video by sequentially comparing the similarity of the key frames, based on the steps of shot boundary detection, usage of a browsing hierarchy, and video indexing. Yi is primarily concerned with browsing and retrieval of compressed video, and Yi is entirely foreign to the idea of compacting video segments in multiple video streams and creating a collage of the video segments collected from the multiple video streams, based on the tracking of people or moving objects in the fields of view of multiple cameras.

Especially, Yi teaches the idea of using a scene tree hierarchy as a structure to facilitate browsing, where the main idea of the scene tree hierarchy is to sequentially compare the similarity of the key frames between the current shot and previous shots. Yi does not compare the similarity of the key frames that belong to different video streams. In the present invention, one of the objectives is to create a collage of video segments that contains trip information of the people or moving objects from multiple video streams, so that the collage further facilitates a behavior analysis process in a serialized and logically-organized collection of video segments.

Chen, X. and Zhang, C. 2007. Interactive mining and semantic retrieval of videos. In Proceedings of the 8th international Workshop on Multimedia Data Mining: (Associated with the ACM SIGKDD 2007) (San Jose, Calif., Aug. 12-12, 2007). MDM '07. ACM, New York, N.Y., 1-9, (hereinafter Chen) disclosed a method for detecting and retrieving semantic events from surveillance videos. Chen discussed the problem of sequential browsing of a large amount of video as time consuming and tedious for users. The goal of Chen is to retrieve semantic events by analyzing the spatiotemporal trajectory sequences. Chen pointed out that, since individual users may have their own subjective query target, the analysis criteria may be ambiguous while trying to satisfy each individual. Therefore, Chen tried to use the interaction process with users, which is called Relevance Feedback, to learn the user's interest dynamically. Chen showed a method for semantic video abstraction and retrieval that allowed a user to skip an uninteresting part of the video and to detect a semantically meaningful part by object tracking and modeling the trajectories of semantic objects in videos.

However, Chen is foreign to the novel data storage format of compact video streams by removing video segments that do not contain track sequences of people or moving objects from multiple video streams.

Jiang, H. and Elmagarmid, A. 1998. Spatial and temporal content-based access to hypervideo databases. The VLDB Journal 7, 4 (December 1998), 226-238, (hereinafter Jiang) disclosed a method for a content-based video retrieval system based on spatial and temporal relationship between objects in a video database. Using a logical hypervideo data model, i.e., multilevel video abstractions, and the semantic associations of the multilevel video abstractions with other logical video abstractions, Jiang tried to retrieve semantically described video data with predefined spatiotemporal query languages. The multilevel video abstractions in the logical hypervideo data model include video entities that users are interested in, defined as hot objects. Semantic association in Jiang included not only an object's spatial and temporal relationship obtained automatically by object tracking, but also manual annotation of each object. For more efficient browsing and retrieving than sequential browsing, Jiang used a video hyperlink that is a connection among logical hypervideo data based on semantic association.

However, similar to Chen, Jiang is foreign to the novel data storage format of compact video streams by removing video segments that do not contain track sequences of people or moving objects from multiple video streams for the purpose of facilitating behavior analysis.

The benefits of the present invention can be utilized in many application areas. For example, U.S. Pat. No. 6,496,856 of Kenner, et al. (hereinafter Kenner) disclosed a method and architecture of a video clip storage and retrieval system that has a capability of handling a large number of users at a low cost. Kenner also suggested a new interface between users and a video retrieval system. The typical video on demand (VOD) architecture uses a centralized networking computer system. This architecture, however, is limited or partially "distributed," which links multiple personal computers together in order to fashion a much large monolithic functional unit. When a user requests a video clip, the Primary Index Manager sends the request to the other local search unit. If a desired video clip is found, Kenner creates a Data Sequencing Interface with the user's local search unit that is connected to the user's terminal, and sends the found video clip.

Kenner is just VOD architecture and explained a method for avoiding high congestion at the VOD server. Kenner is foreign to the idea of storing reduced size video streams based on track sequences of people or moving objects for the application of behavior analysis. A VOD system like Kenner can utilize the benefits of the present invention in order to reduce the video storage size and deliver the video clips that are truly demanded by the users, if the user's goal for the retrieval is to find video clips that are used for a behavior analysis of the people or moving objects in an application area of behavior analysis.

In a preferred embodiment, the present invention can primarily benefit various types of applications for analyzing human and moving object behaviors. For example, the present invention can facilitate the behavior analysis of people or moving objects in a retail store or surveillance application.

SUMMARY

The present invention is a system and method for storing videos based on track sequences and selection of video segments for people that visited an area covered by multiple means for capturing images, such as cameras.

The present invention captures video streams of the people in the area by multiple cameras and tracks the people in each of the video streams. The tracking of the people produces track sequences in each video stream. Then, the present invention finds information for the trip of the people based on the track sequences. The trip information includes, but is not limited to, coordinates for the positions of the people, temporal attributes of the tracks, video stream identification (ID), video segment ID, trip ID, and person ID for each of the people.

The present invention determines a first set of video segments that contain the trip information of the people, i.e. trip video segments, and a second set of video segments that do not contain the trip information of the people in each of the video streams. The next process is to compact each of the video streams by removing the second set of video segments that do not contain the trip information of the people from each of the video streams. The video segments in the first set of video segments are associated with the people based on the information for the trip of the people.

The associated first set of video segments is logically organized based on one or more rules. The rules comprise a trip-centered video indexing scheme. By associating the first set of video segments with the people based on the information for the trip of the people, including a table of indices, the present invention creates a trip-centered format that stores the compacted video streams with the first set of video segments based on the track sequences from multiple cameras. The format facilitates multiple applications dealing with behavior analysis and provides an efficient storage.

The format also enables the user to access the compacted video streams and the first set of video segments efficiently without a loss of the video segments that contain the trip information.

The track sequences are merged into a track, and the entire trip of the people can be played back in the logically-organized sequence of video segments.

It is an objective of the present invention that the stored videos support a re-mining of the behavior of the people. The re-mining comprises an analysis and recognition of detailed behavior.

It is another objective of the present invention to allow users to annotate the compacted video streams and the first set of video segments in a novel way. The annotation facilitates multiple applications dealing with behavior analysis, including areas of human behavior analysis, loss prevention, investigation, security, animal research, medical research, and sociology research.

DRAWINGS

Figures

FIG. 5 shows an exemplary lookup table for video segments, in which people's trips are detected.

DETAILED DESCRIPTION OF THE INVENTION

Figure 1:
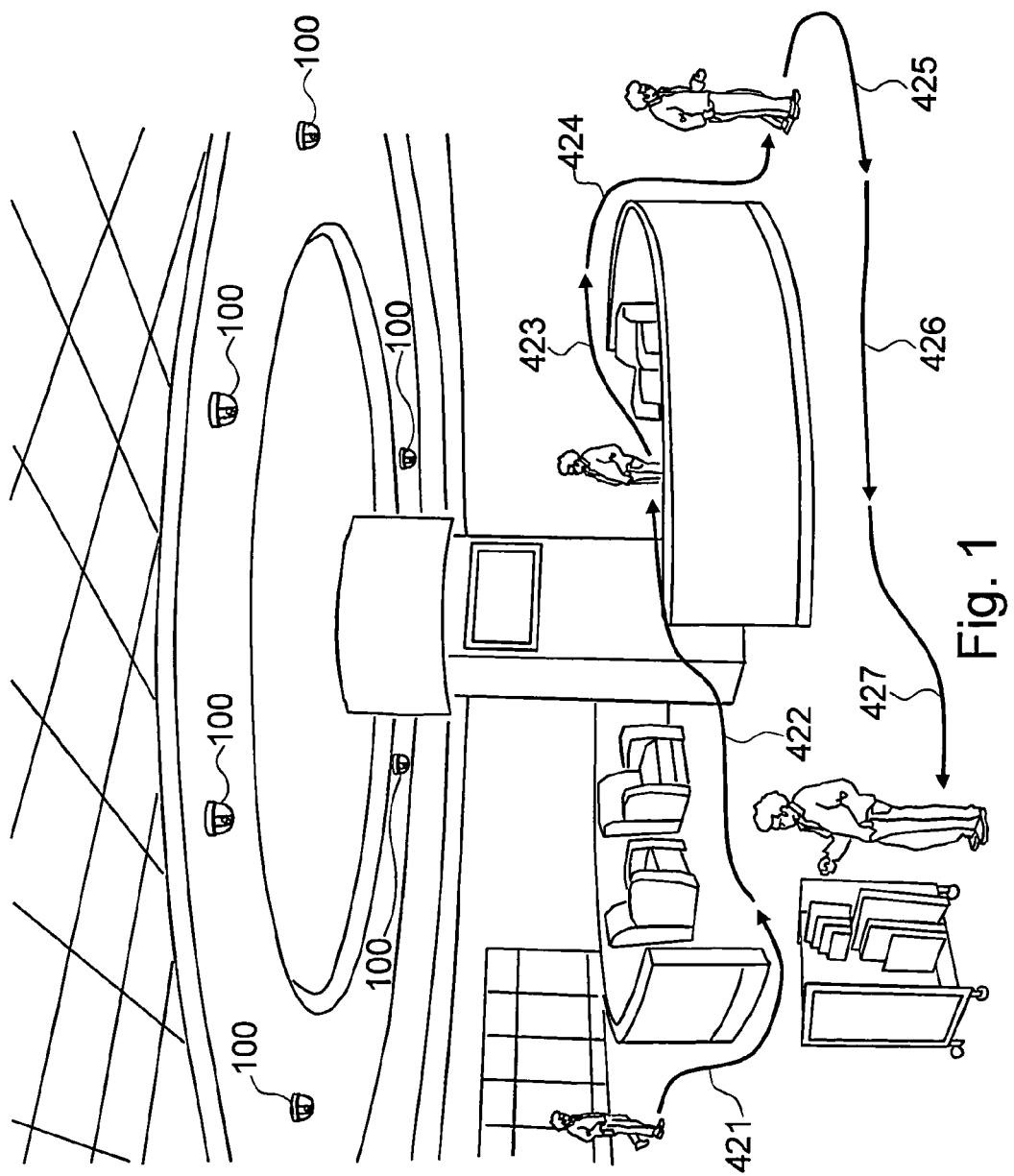
FIG. 1 shows an exemplary application of the preferred embodiment of the present invention in an area.

FIG. 1 shows an exemplary application of the preferred embodiment of the present invention in an area.

The present invention is a system and method for storing videos based on track sequences and selection of video segments for people that visited an area covered by multiple means for capturing images, such as cameras. FIG. 1 shows exemplary installation of multiple means for capturing images 100 in a place. The present invention is named VIDEORE. VIDEORE is not only a system and method for storing videos, but also a format of the stored video data. For simplicity, the term camera will be used as an exemplary means for capturing images hereinafter.

The present invention captures video streams of the people in the area by multiple cameras, and tracks the people in each of the video streams. The tracking of the people produces track sequences in each video stream. The track segments from 421 to 427 in FIG. 1 show exemplary track sequences that could appear in multiple video streams captured by multiple cameras installed in the space. Then, the present invention finds information for the trip of the people based on the track sequences. The trip information includes, but is not limited to, coordinates for the positions of the people, temporal attributes of the tracks, video stream ID, video segment ID, trip ID, and person ID for each of the people.

The present invention determines a first set of video segments that contain the trip information of the people, which are called "trip video segments", and a second set of video segments that do not contain the trip information of the people in each of the video streams. The next process is to compact each of the video streams by removing the second set of video segments that do not contain the trip information of the people from each of the video streams.

Finally, the video segments in the first set of video segments are associated with the people based on the information for the trip of the people. The association is processed utilizing a plurality of novel data structures. Exemplary "trip video segment information data structure", "trip information data structure", and "person information data structure" are discussed later.

The associated first set of video segments is logically organized based on one or more rules. The rules comprise a trip-centered video indexing scheme. Utilizing the set of indices is one of the ways to associate the video segments with the people's trips. In this approach, given a person's trip, the present invention has a set of indices that point to the corresponding video segments in the first set of video segments. The set of indices can be stored in a data structure, such as a table of indices. A plurality of pointers in a linked list of pointers to the relevant video segments in "trip information data structure" is an exemplary indexing scheme that is used in the present invention.

By associating the first set of video segments with the people based on the information for the trip of the people, including the table of indices, the present invention creates a trip-centered format that stores the compacted video streams with the first set of video segments based on the track sequences from multiple cameras. The format facilitates multiple applications dealing with behavior analysis and provides an efficient storage.

The format also enables the user to access the compacted video streams and the first set of video segments efficiently, without a loss of the video segments that contain the trip information.

The track sequences, e.g., from 421 to 427 in FIG. 1, from multiple video streams captured by multiple cameras are merged into a track for each person, and the entire trip of the person can be played back in the logically-organized sequence of video segments.

When track sequences are merged, the present invention resolves a disambiguation among multiple video segments in the first set of video segments, if the people are visible in more than one video segment in the first set of video segments. Exemplary algorithms for resolving the disambiguation will be discussed later.

The stored final output of the videos by the present invention supports a re-mining of the behavior of the people. The re-mining comprises an analysis and recognition of detailed behavior.

The present invention also allows users to annotate the compacted video streams and the first set of video segments, wherein the annotation facilitates multiple applications dealing with behavior analysis, including areas of human behavior analysis, loss prevention, investigation, security, animal research, medical research, and sociology research.

Figure 2:
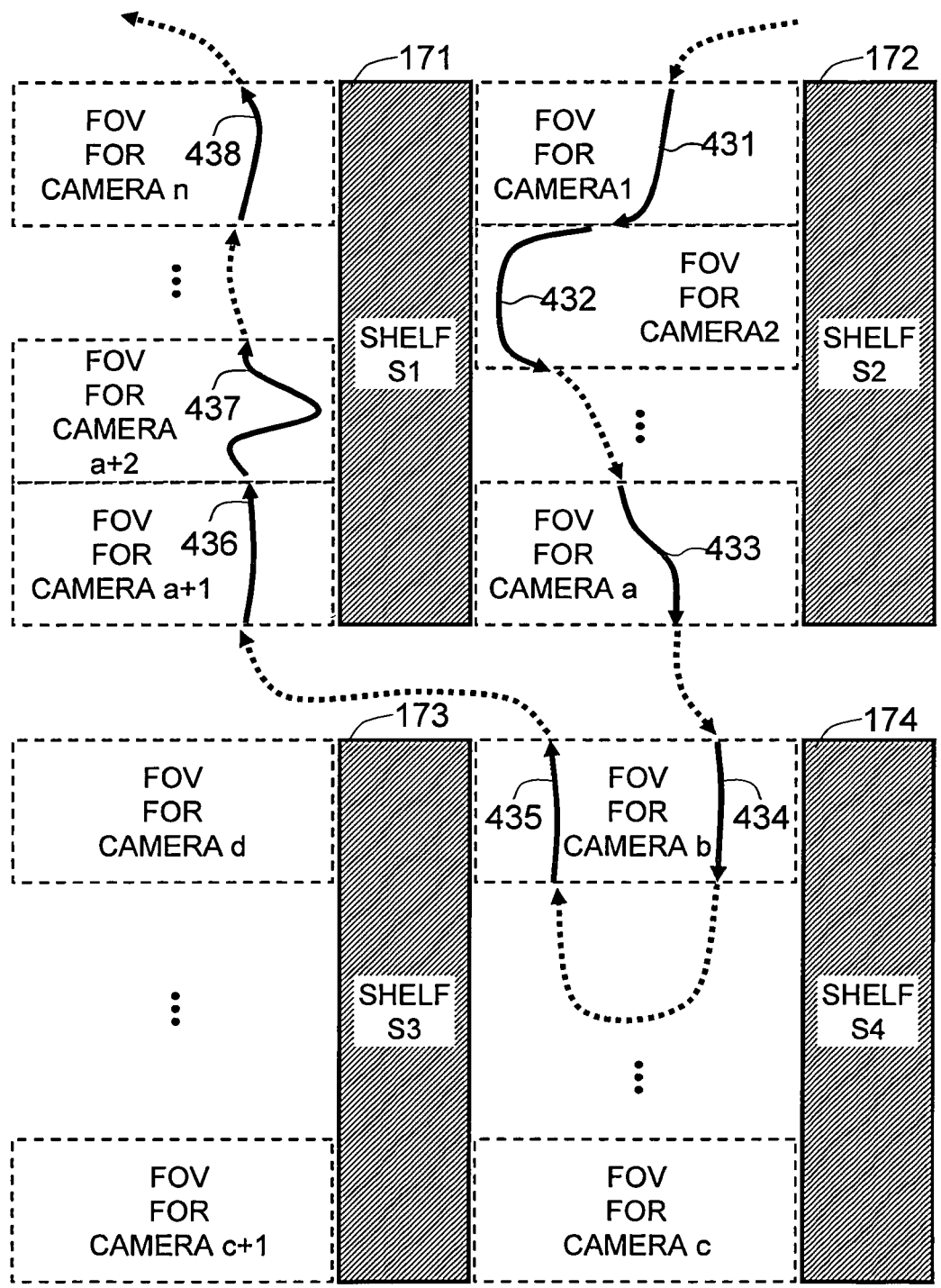
FIG. 2 shows an exemplary tracking of a person that passes through a plurality of fields of view from a plurality of means for capturing images in an aisle area.

FIG. 2 shows an exemplary tracking of a person that passes through a plurality of fields of view from a plurality of means for capturing images in an aisle area.

In an exemplary aisle area, where the present invention can be deployed as shown in FIG. 2, a plurality of means for capturing images, such as cameras, are installed to cover the area. When a person passes through the area, the present invention tracks the person in each field of view of the cameras. Each of the track segments, e.g., from 431 to 438, in which the person appears are associated with the person in a data structure in order to create a reorganized sequence of video segments based on the person tracking.

The track segments of the person may not appear in all of the video streams covered by the cameras in the area during a specific window of time. For example, the area to the left of "Shelf S3" 173 is not visited by the person during the window of time, thus the video streams of the cameras in the area next to the "Shelf S3" 173 will not have the person's tracking information during the time of the visit.

Furthermore, if nobody visits the specific area during the same window of time, the present invention does not store the video segments that correspond to the duration, saving the amount of memory space for the duration of time for the video streams produced by the cameras in the specific area.

Since not all of the areas may be covered by the cameras, if the person makes a trip to an area that is not covered by the cameras, the final output of the collaged video segments will not have the track sequences during that portion of the period. In the collaged video, this duration is identified by the timestamp of the last appearance before the person makes the trip to the area that is not covered by the cameras, and another timestamp of the first appearance after the person makes the trip to the area that is covered by the cameras, and the collaged video segments will have an effect of saving the time of analyzing the person's trip. The arrangement of the camera installation should be strategically decided, so that the areas of interest are covered by the cameras.

If the person reappears in the same field of view, each track is distinguished by the different timestamps calculated for each track. For example, when a person makes a U-turn trip in an area, the first and second appearances in the video stream are distinguished by the different timestamps. An exemplary "track segment T4" 434 and another exemplary "track segment T5" 435 are examples of track segments that represent the first and second appearances in a reappearance case, respectively.

Figure 3:
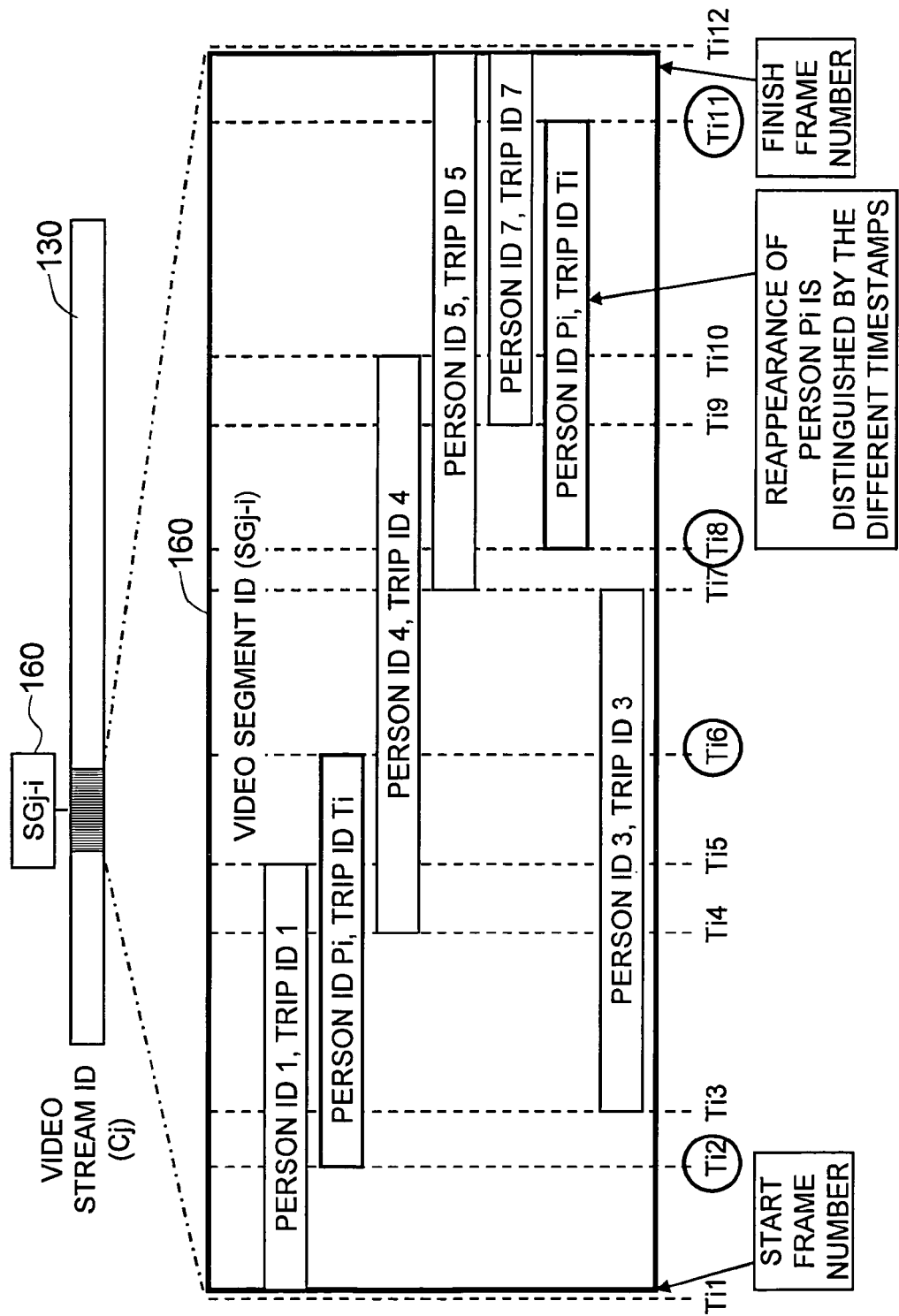
FIG. 3 shows details of an exemplary trip video segment, which comprises a video stream ID, a video segment ID, a start frame number, a finish frame number, and a plurality of trip measurements, including person IDs and trip IDs.

FIG. 3 shows details of an exemplary trip video segment 160, which comprises a video stream ID, a video segment ID, a start frame number, a finish frame number, and a plurality of trip measurements, including person IDs and trip IDs, in an exemplary video stream 130.

As defined earlier, the trip video segment is a video segment that contains at least one trip information of the people.

The present invention travels through a video stream, and it marks a start time of a trip video segment if it finds a new track segment of a person. Then, it continues to find any further track segments and the discontinuation of the track segments.

If the present invention finds any further track segments, the track segments are regarded as member track segments of the trip video segment, and the present invention continues the search process. The track segments are augmented with the trip's attribute information as it will be discussed with regard to FIG. 10.

If the present invention finds the discontinuation of the track segments after the last found track segment, then the last frame where the last track segment ends is marked as the finish frame of the trip video segment. Until the present invention meets with the discontinuation of the track segments, i.e. after the finish frame of the trip video, it detects the member track segments of the trip video segment.

This process of finding trip video segments is repeated for all of the video streams. One person is associated with a single trip ID throughout the entire visit to a place, while the trip segments may appear in multiple video streams. Joining of the trip segments in multiple video streams are facilitated by the spatiotemporal information of the trip segments and information from the person characteristic extraction process.

All of the information in a particular trip video segment, i.e., a video stream ID, a video segment ID, a start frame number, a finish frame number, and a plurality of trip measurements, can be stored in a data structure. For example, the trip attribute in each node in a table for linked lists of pointers to video segments 621 shown in FIG. 7 can comprise all of these data elements as the value for the attributes.

In another exemplary embodiment, two separate data structures can also be constructed—one for "trip video segment information data structure" and the other for "trip information data structure."

In this approach, the information for each of the trip video segments is stored in a "trip video segment information data structure" that comprises a video stream ID, a video segment ID, a start frame number, and a finish frame number. The trip video segment information data structure is associated with the actual video segment data, and the data structure can be stored in the same data storage for the compact video streams.

The plurality of trip measurements, such as person IDs, trip IDs, coordinates of track segments, and timestamps of the track segments, can be stored in a "trip information data structure," such as the linked list of pointers to the relevant video segments, separate from the "trip video segment information data structure." The linked list of pointers can contain trip information data elements in each node. Since it may not be necessary to store entire coordinates of track segments in the data structure, only selected coordinates, such as the coordinates of start and finish track segments, can be stored in the "trip information data structure."

As shown in FIG. 3, the trip video segment can comprise a plurality of track segments where length, start time, and finish time can vary. The multiple track segments may overlap if the present invention tracks multiple people during the same window of time. If a person, e.g., a person with the "person ID Pi" in FIG. 3, disappears and reappears in the same trip video segment, the reappearance of the person is distinguished by the different timestamps, e.g., (Ti2, Ti6) vs. (Ti8, Ti11) for person with the "person ID Pi."

In another case, a single trip video segment may contain only one track segment. Furthermore, the one track segment may occupy the entire trip video segment, so that the track segment has the same length as the trip video segment and has the same start and finish time.

Figure 4:
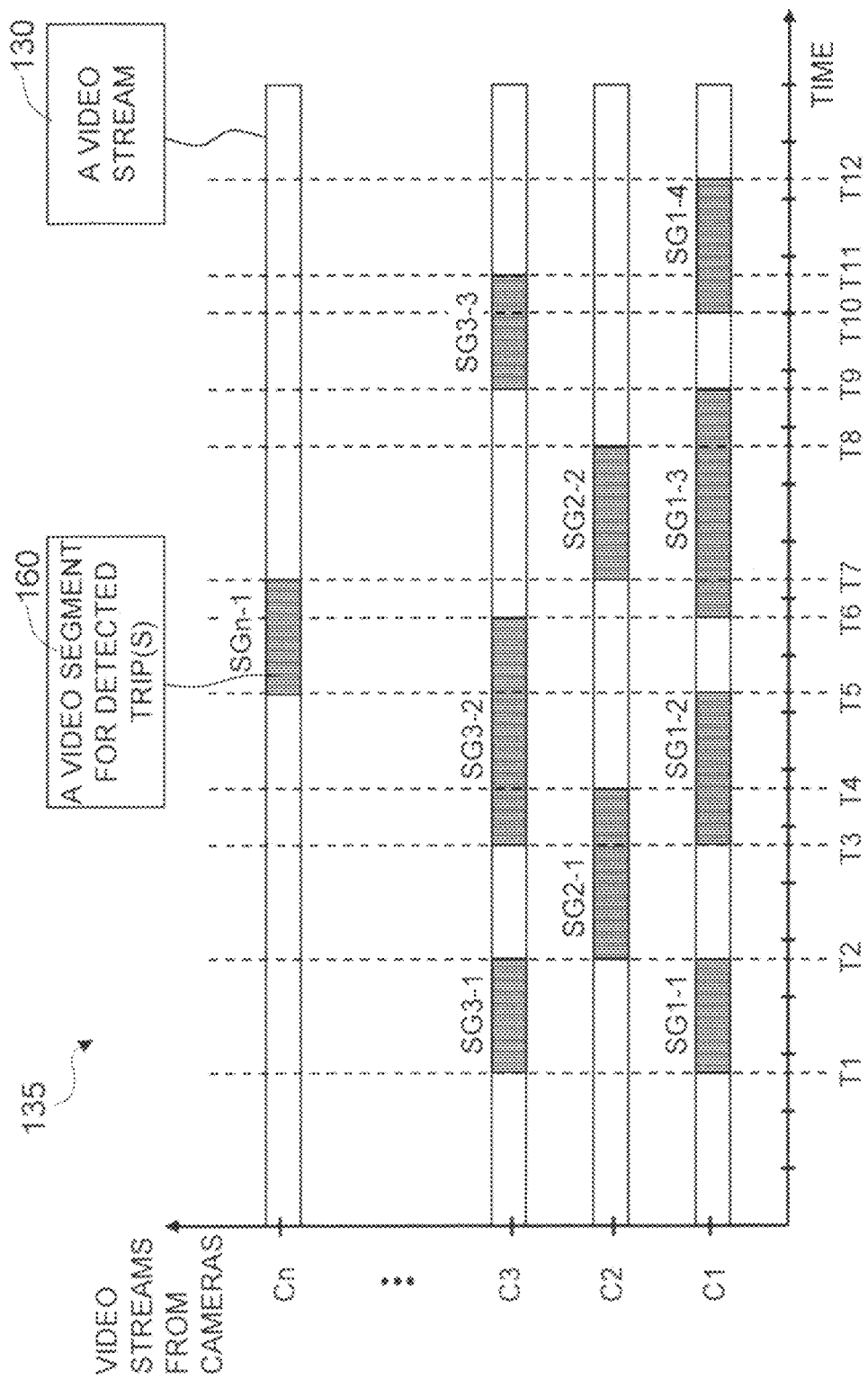
FIG. 4 shows exemplary video segments for a plurality of detected trips in a plurality of recorded video streams.

FIG. 4 shows exemplary video segments for a plurality of detected trips in a plurality of recorded video streams 135.

In this exemplary case, the present invention detected trips by multiple people in a plurality of video streams, i.e., video streams C1, C2, C3, and Cn, among "n" video streams. The track sequences for the multiple people have been found in a set of trip video segments, SG1-1, SG1-2, SG1-3, SG1-4, SG2-1, SG2-2, SG3-1, SG3-2, SG3-3, and SGn-1. The trip video segments can be organized in a chronological order using the "start time" and then the "finish time" in a lookup table.

It can be noted that there can be overlaps of track segments among the video segments during multiple windows of time. For example, there is an overlap between the video segments, SG1-1 and SG3-1, during a window of time, (T1, T2), and another overlap among the video segments, SG1-2, SG2-1 and SG3-2, during a window of time, (T3, T4). Especially, the trip video segment, SG2-2, is inclusively overlapped to the trip video segment, SG1-3.

The overlaps of the video segments do not necessarily mean the multiple appearances of a person's track sequences in the overlapped video segments. However, if an ambiguity occurs due to multiple appearances of a person's track sequences in multiple video segments, the ambiguity is resolved through a decision-making process as discussed with regard to FIG. 12.

FIG. 5 shows an exemplary "lookup table for video segments" 622, in which people's trips are detected.

The "lookup table for the trip video segments" 622 can be created per video stream, so that each table contains the trip video segments of a specific video stream.

However, in the exemplary lookup table shown in FIG. 5, the trip video segments from all video streams during a window of time are combined and organized in a chronological order. The video segments in the rows are ordered by "start time" then "finish time," based on a greedy algorithm.

When the present invention wants to access a particular video segment, the lookup table can provide information for the video stream in which the video segment can be found and the timestamps of the video segment. One use of the table is to facilitate the process of serializing the trip video segments.

Figure 6:
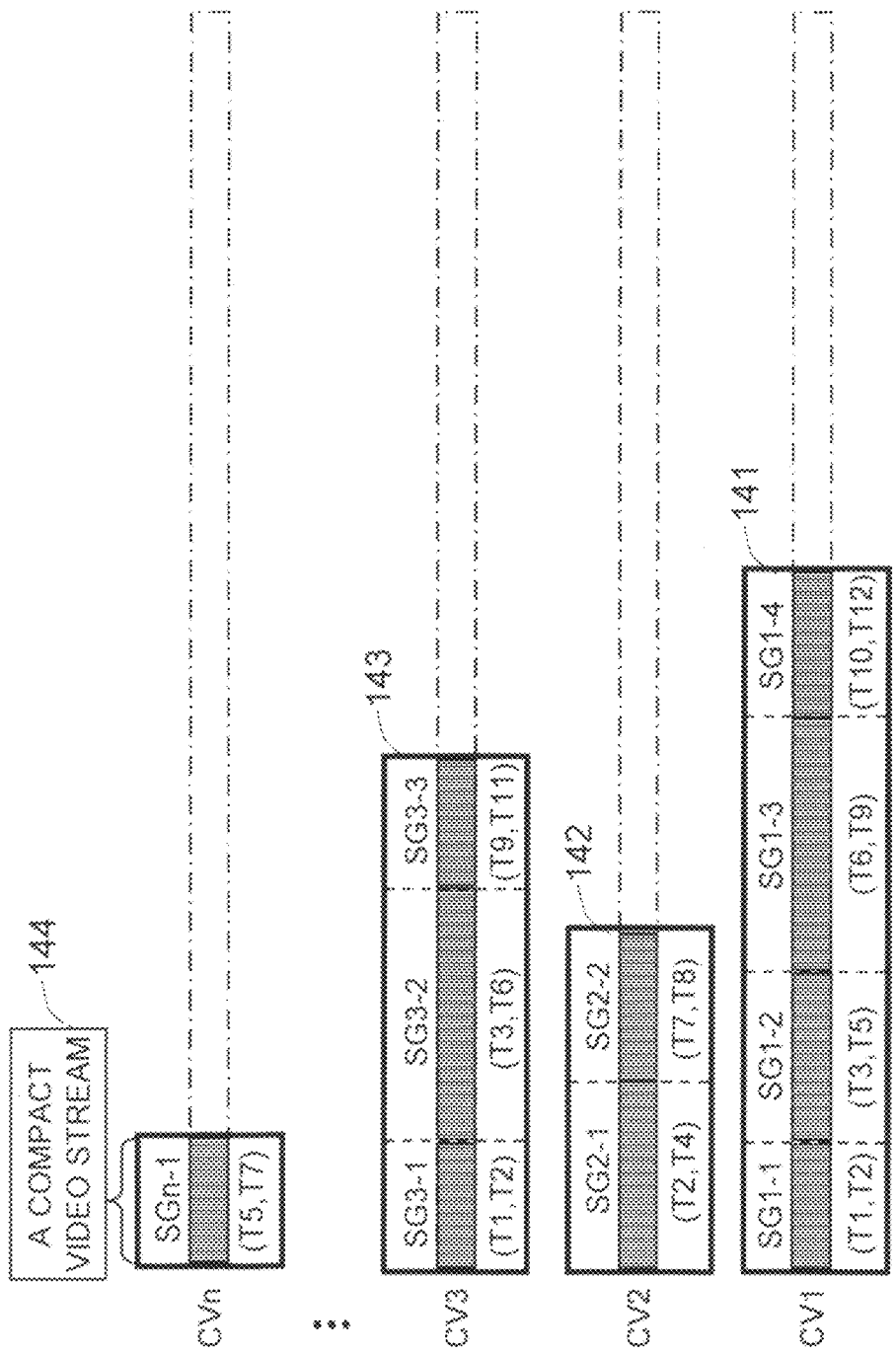
FIG. 6 shows exemplary compact video streams with the video segments for a plurality of detected trips from a plurality of recorded video streams after a compaction process.

FIG. 6 shows exemplary compact video streams, i.e., "compact video stream 1" 141, "compact video stream 2" 142, "compact video stream 3" 143, and "compact video stream n" 144, with the video segments for a plurality of detected trips from a plurality of recorded video streams after a compaction process, with regard to the exemplary video segments in FIG. 4. The compact video streams contain only the serialized trip video segments after the video stream compaction process.

Each of the compact video streams has an equal or less data storage size than the original video stream. Regardless of whether one single track is detected or multiple tracks are detected in a trip video segment, each trip video segment is stored only once in a compact video stream. Therefore, the amount of data storage for each of the compact video streams is less than the data storage amount of the original video stream in most cases, and it is equal to the data storage amount of the original video stream in the worst case.

As mentioned earlier, the information for each trip video segment in a compact video stream is stored in a trip video segment information data structure in an exemplary embodiment. A compact video stream ID that is associated with each trip video segment can be added to the trip video segment information data structure. When the present invention wants to access a particular trip video segment for one or multiple track segments, the trip video segment information data structure and the lookup table mentioned earlier can provide information for the compact video stream in which the trip video segment can be found and the timestamps of the trip video segment in the compact video stream.

Figure 7:
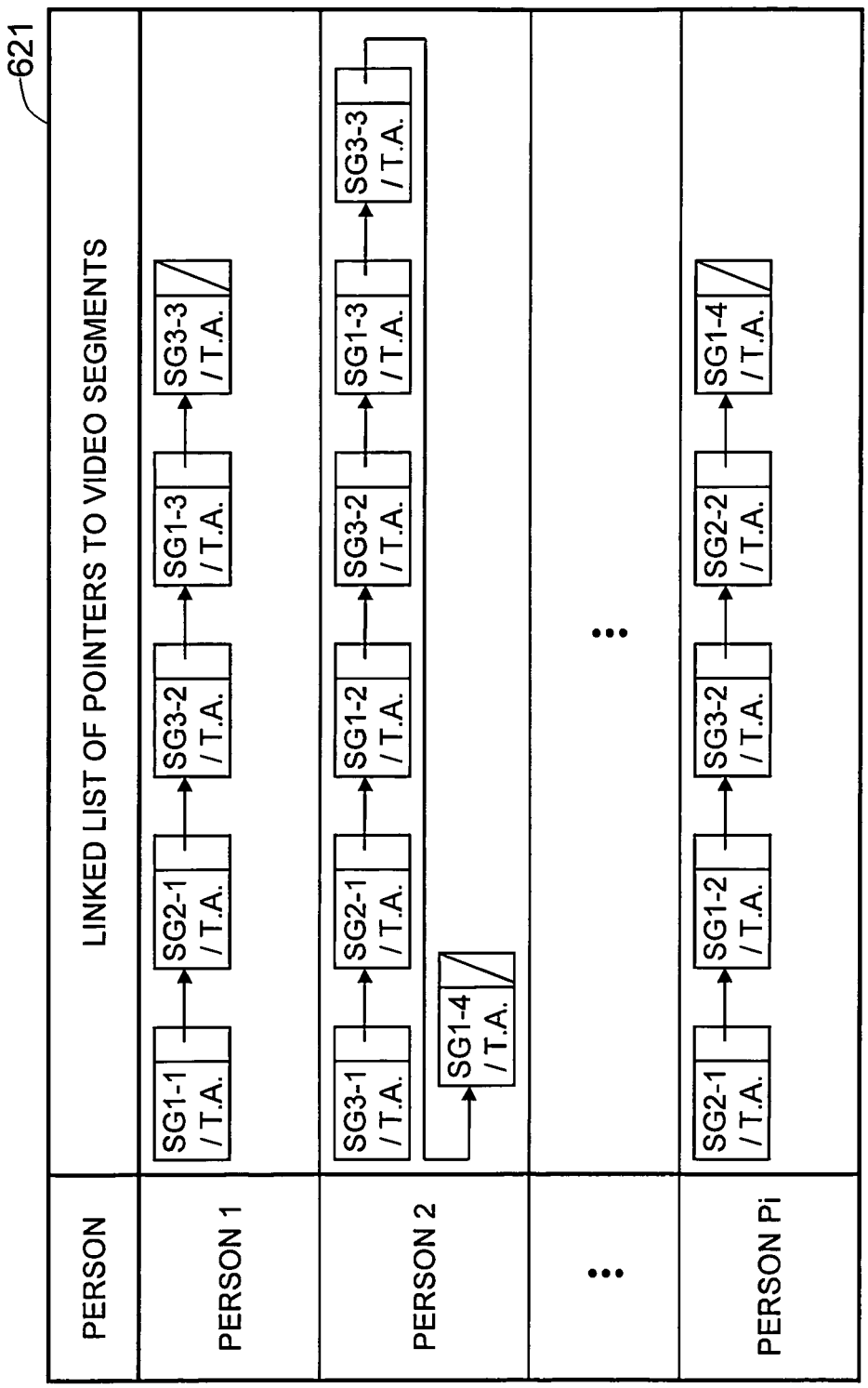
FIG. 7 shows an exemplary table for linked lists of pointers to video segments for a plurality of people's trips.

FIG. 7 shows an exemplary "table for linked lists of pointers to video segments" 621 for a plurality of people's trips.

The linked list of pointers not only contains the pointers to the relevant video segments, but also the trip attributes data structure in the nodes. The trip attributes data structure can comprise a video stream ID, compact video stream ID, a video segment ID, a start frame number, a finish frame number, and a plurality of trip measurements, such as person IDs, trip IDs, coordinates of track segments, and timestamps of the track segments. The data element in each node is used in order to refer to the relevant trip video segment in creating a collage of the trip video segments, i.e., a logically-organized video, per person.

It needs to be noted that the timestamps of the track segments may be different from the timestamps of the trip video segments. The timestamps of a track segment mark the start and finish of each track segment per person, whereas the timestamps of a trip video segment mark the start and finish of a video segment that contains one or more trip information of people, including the track segments, between the timestamps.

The timestamps of the track segments is particularly important in creating a collage of trip video segments per person, because these actually mark the start and finish of each track segment of the specific person in a particular trip video segment. Therefore, when the present invention plays back the collage of trip video segments for a person, it utilizes the timestamps of the track segments that are stored in the trip attributes data structure in the nodes.

Figure 8:
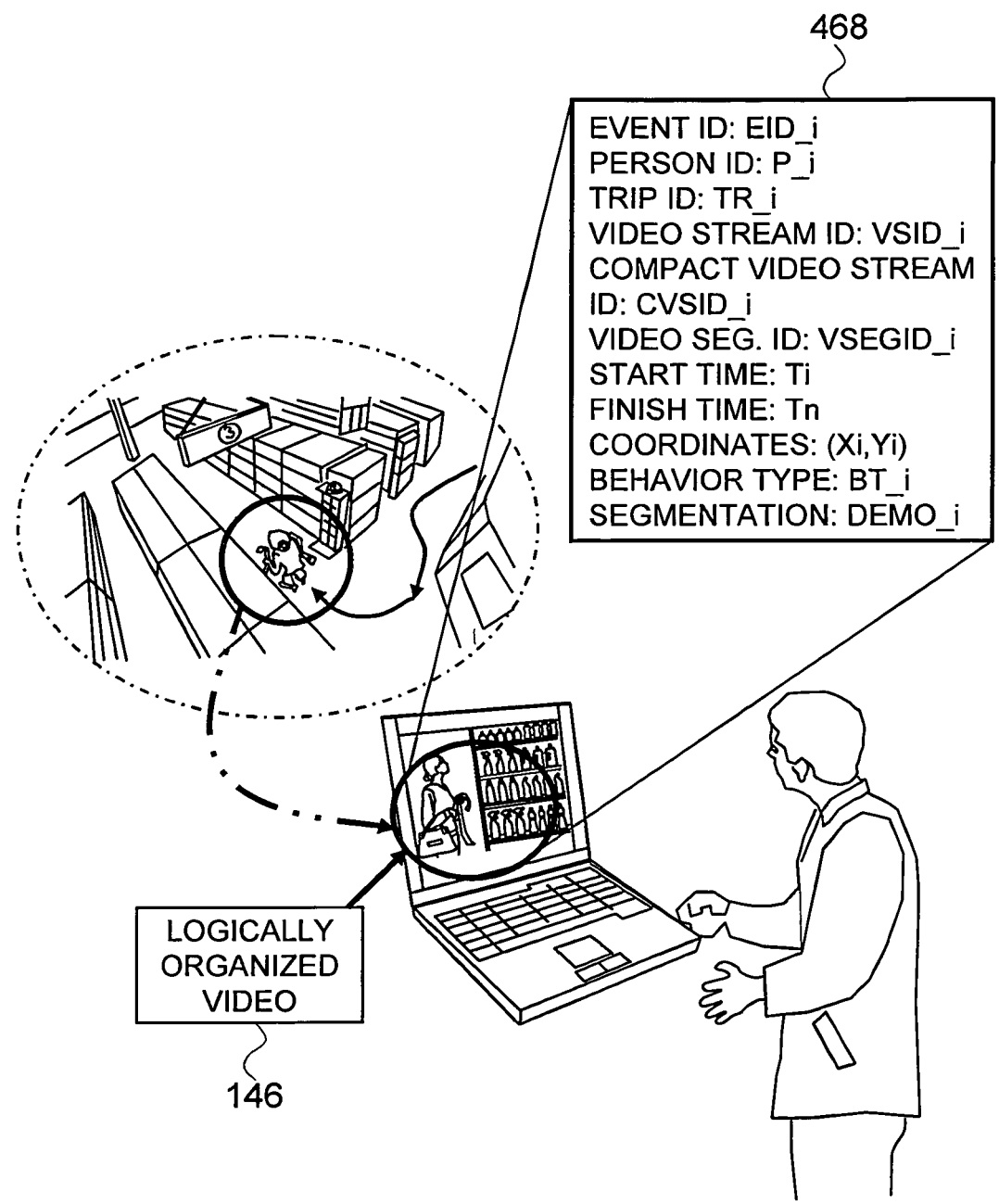
FIG. 8 shows an exemplary usage of the output, i.e., a logically-organized video, produced from the processes in the present invention.

FIG. 8 shows an exemplary usage of the output, e.g., a logically-organized video 146, produced from the processes in the present invention.

In a preferred embodiment, the tasks of behavior analysis and annotation can be greatly aided by the present invention. For example, the trip attributes 468 in the trip attributes data structure provides information not only for creating a logically organized video 146, but also for aiding a detailed video-based behavior analysis. Also, the logically-organized video 146 of a person's trip in a physical place not only shows dynamic views of the trip of the people or moving objects, but also reduces the unnecessary video frames from the original video streams, thus efficiently reducing the amount of video frames to look at and the amount of time to work with. This further helps the human analyst or annotator from having boredom and tiredness, watching a huge amount of video data.

Furthermore, the current invention can be applied to any animated object in the field of view of the cameras. Therefore, the processes and final output of the present invention can be applied to various behavior analysis applications, including areas of human behavior analysis, loss prevention, investigation, security, animal research, medical research, and sociology research.

Figure 9:
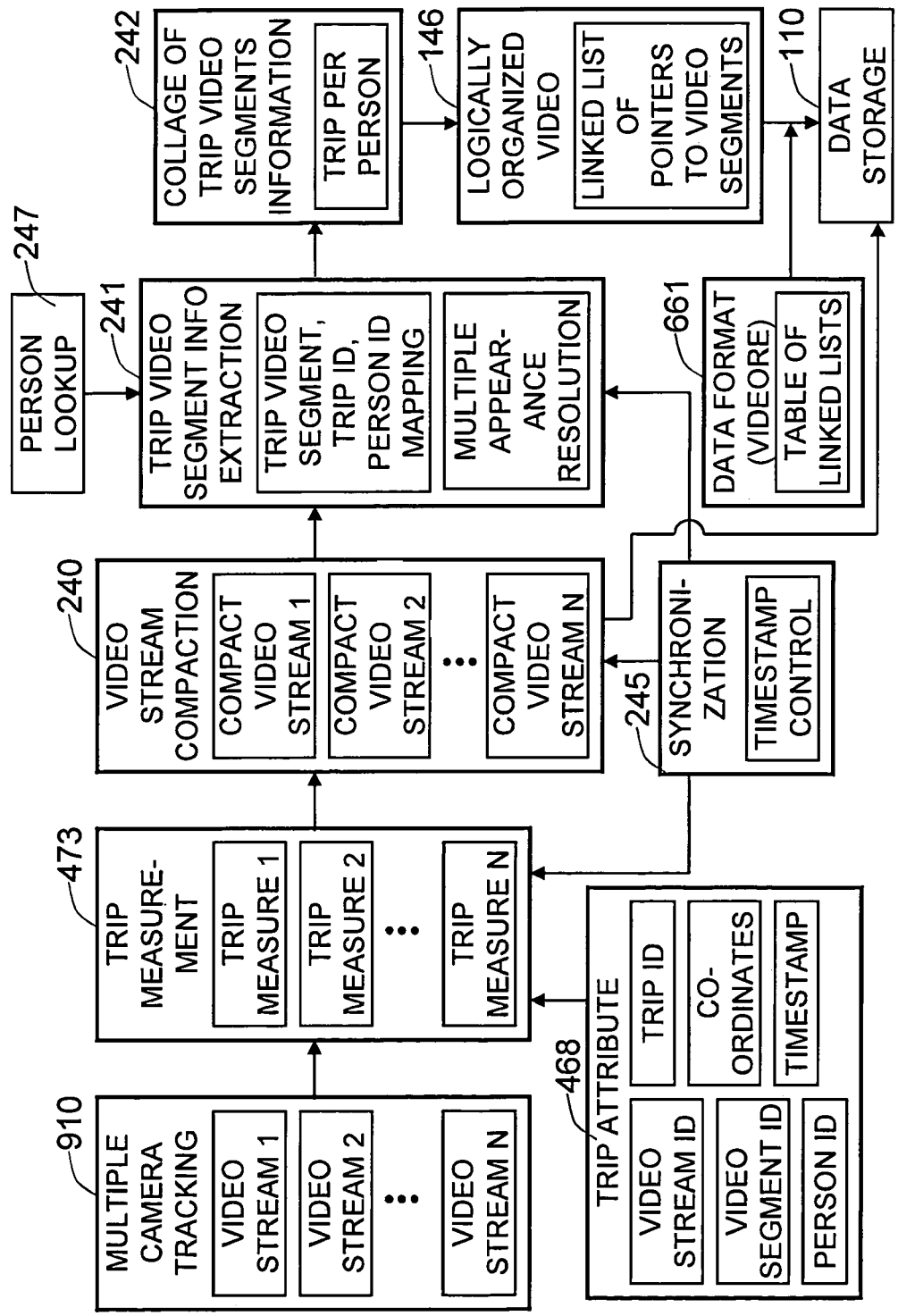
FIG. 9 shows key components of an exemplary embodiment of the present invention.

FIG. 9 shows key components of an exemplary embodiment of the present invention.

The present invention utilizes multiple cameras 910 to track the people in an area of interest and captures multiple video streams. The track sequences of the people are augmented with additional information for the trip attributes 468 at the trip measurement 473 stage. Based on the trip information, trip video segments in each video stream are identified, and each of the video streams is divided into two different sets of video segments.

At the compaction 240 process, the present invention utilizes the first set of video segments that contain the trip information of the people, i.e., trip video segments, and a second set of video segments that do not contain the trip information of the people in each of the video streams.

The next process is to compact each of the video streams by removing the second set of video segments that do not contain the trip information of the people from each of the video streams. This process results in compact video streams that are composed of only the first set of video segments, i.e., trip video segments. The compact video streams are saved in a data storage 110.

Following a person's tracking, a module for trip video segment information 241 extraction detects the relevant sequence of video segments in the compact video streams and maps the person's ID and trip ID along with the video segments. In this process, ambiguities caused by multiple appearances of the person in multiple video segments are also resolved.

The present invention creates a "collage of video segments information" 242 according to the extracted video segments information per person, and the collage of video segments information 242 is stored in a data storage 110. The collage of video segments information 242 can essentially create a logically organized video 146 for the specific person based on the person's trip information, in the sense that the references to the video segments can be logically organized according to a goal.

The organization can be formulated in a data structure, such as a linked list of pointers, where the pointers point to the relevant video segments with the targeted trips and track segments in compact video streams. Each of this logically-organized video information for the people of interest can further be organized according to the specifications of a data format 661, which can be also called "VIDEORE format". For example, one exemplary data format structure can be a table of linked lists. The stored compact video segments can be retrieved at the later playback process using the information in the data structure. The entire processes are synchronized 245 with a time server, and timestamps are created for the data.

Figure 10:
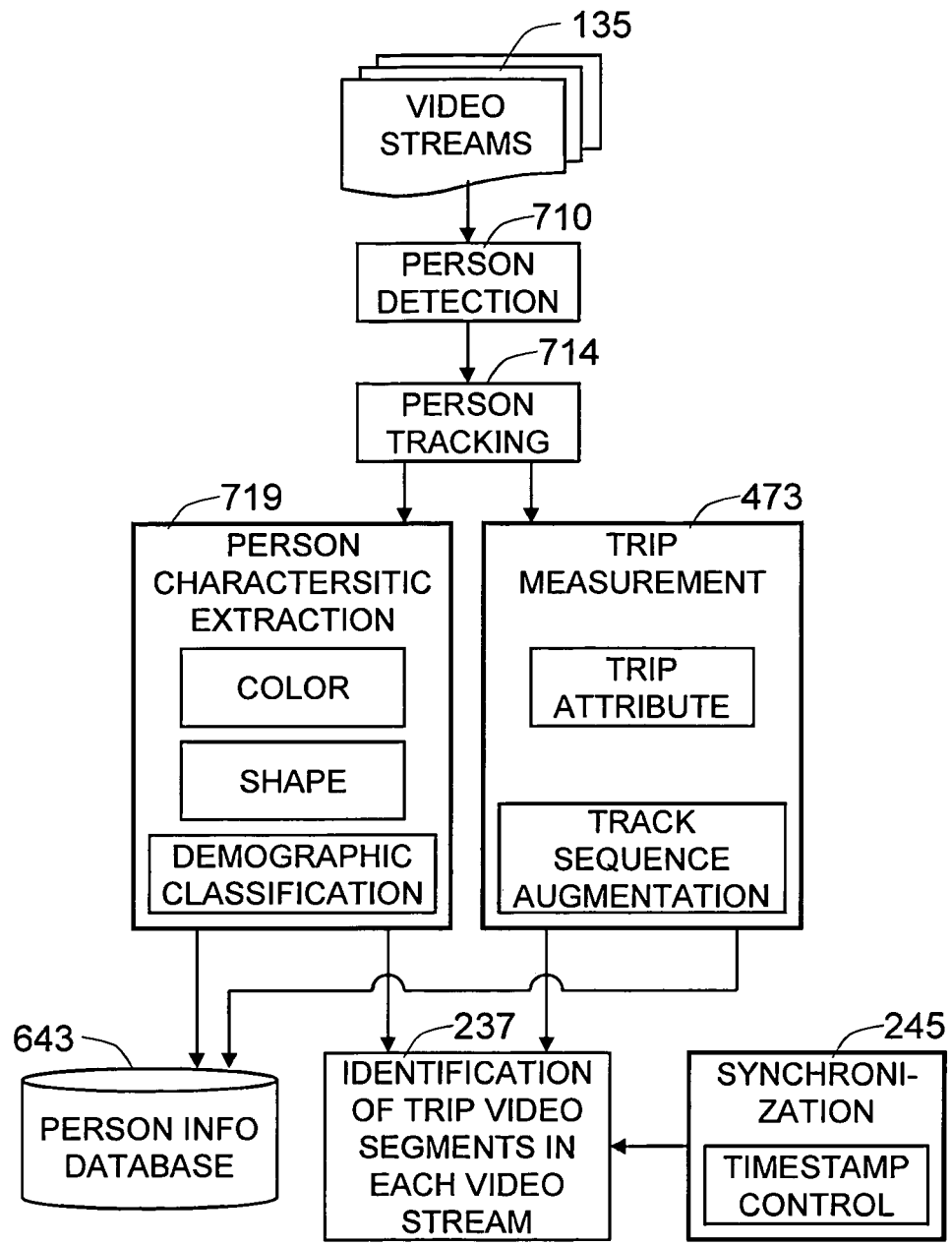
FIG. 10 shows exemplary processes of a trip measurement and identification of trip video segments in each video stream in the present invention.

FIG. 10 shows exemplary processes of a trip measurement and identification of trip video segments in each video stream in the present invention.

In the exemplary embodiment shown in FIG. 10, the present invention utilizes a plurality of means for capturing images 100, such as cameras, to track the people in an area of interest and capture multiple video streams 135. Using image processing algorithms, the present invention detects 710 and tracks 714 each person, such as a customer, in the video streams captured by the cameras.

With regard to the person detection and tracking, the present invention can utilize any reliable video analytic tracking algorithms using multiple cameras that are known in the practiced art of computer vision research. For example, U.S. Pat. No. 8,098,888 of Mummareddy, et al. (hereinafter Mummareddy) disclosed a method and system for automatic analysis of the trip of people using multiple cameras.

Based on the tracking information, the present invention performs the trip measurement 473 of the people. The track sequences of the people are augmented with additional information, which determines the values for the trip attributes at the trip measurement stage. The trip attributes comprise, but are not limited to, coordinates for the positions of the people, temporal attributes of the tracks, video stream ID, video segment ID, trip ID, and person ID for each of the people.

The plurality of trip measurements, such as person IDs, trip IDs, coordinates of track segments, and timestamps of the track segments, can be stored in a "trip information data structure," such as the linked list of pointers to the relevant video segments where each node in the list contains trip information data elements.

In an exemplary embodiment of the present invention, the person IDs are also stored in a data structure for the people of interest, e.g., a table for person lookup 623, so that the person lookup table can be used to manage and find the information for the person of interest at the time of creating a logically organized video for the particular person. The information for the person is stored in a "person information data structure", such as a person lookup table, that can reside in a person information database 643 in association with the "trip information data structure."

Based on the trip information, trip video segments in each video stream are identified 237, and each of the video streams is divided into two different sets of video segments—a first set of video segments that contain the trip information of the people, i.e. trip video segments, and a second set of video segments that do not contain the trip information of the people in each of the video streams.

In addition to distinguishing the trip video segments, the present invention also extracts characteristic information 719 for each person's tracking in the trip video segments. The characteristic information comprises the color and shape of the person. In addition, the present invention can also utilize demographic information as a way to identify the person. The demographic segment information includes age range, gender, and ethnicity.

The present invention can utilize any reliable demographic composition measurement method in the prior art for this process. For example, U.S. patent application Ser. No. 11/805,321 filed on May 23, 2007 of Sharma, et al. (hereinafter Sharma Ser. No. 11/805,321) disclosed an exemplary demographic composition measurement based on gender and ethnicity.

The characteristic information is used to identify which track segment belongs to which person in coordination with the spatiotemporal information, such as coordinate sequences and timestamps of the track segments, when there are multiple track segments in a video segment during a window of time. For example, when a person's track segment appears in a video segment that has other track segments that belong to other people, the characteristic information is useful to help the module of "trip video segment information extraction" 241 in finding the correct track segment that belongs to the person.

Figure 11:
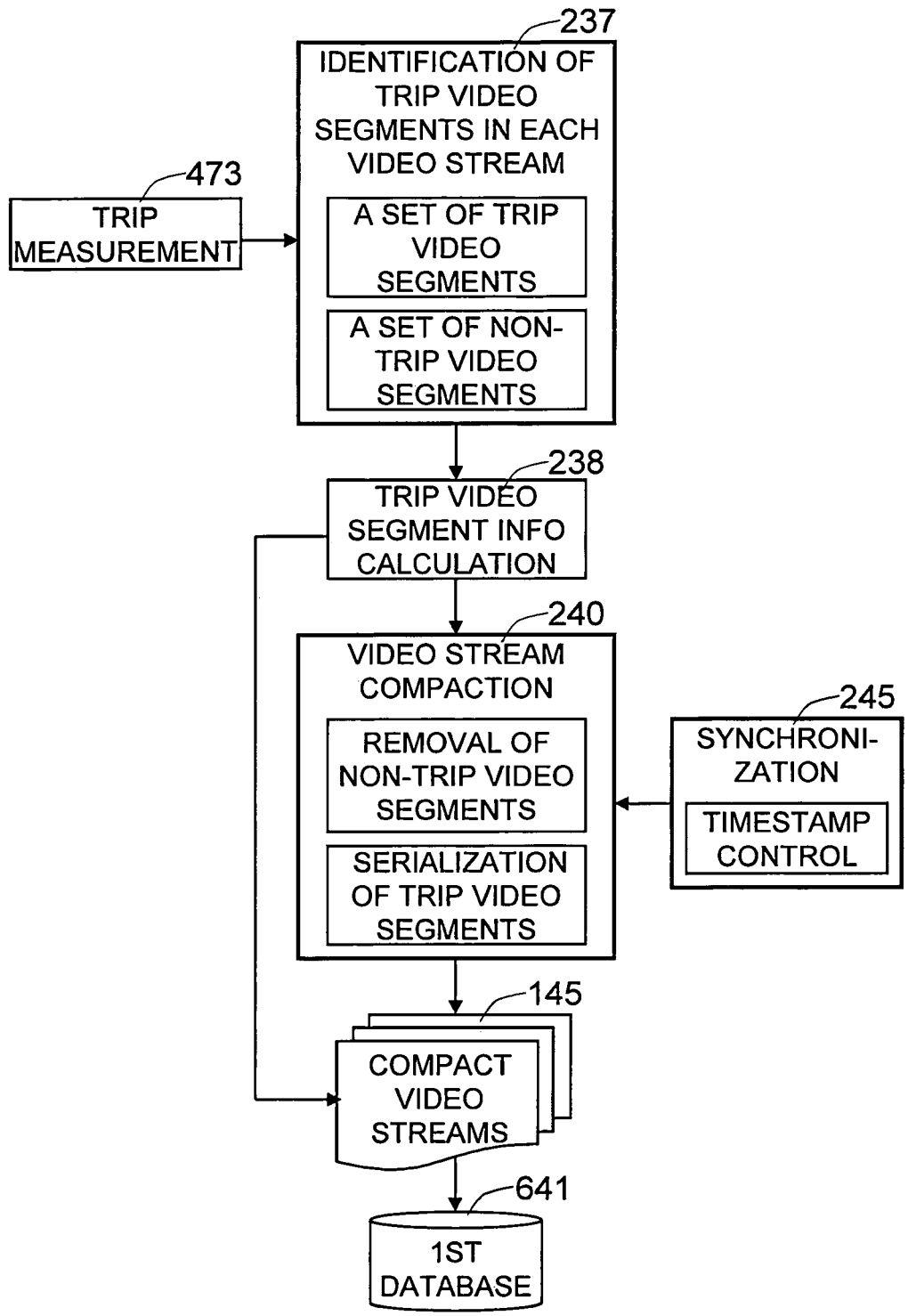
FIG. 11 shows exemplary processes of a video stream compaction in the present invention.

FIG. 11 shows exemplary processes of a video stream compaction 240 in the present invention.

After trip video segments in each video stream are identified 237 and each of the video streams is divided into two different sets of video segments, i.e., a set of trip video segments and a set of the other video segments, the present invention calculates the information for each of the trip video segments 238.

The information for each of the trip video segments is stored in a trip video segment information data structure that comprises a video stream ID, a video segment ID, a start frame number, and a finish frame number. The trip video segment information data structure is associated with the actual video segment data, and it can be stored in the same data storage for the compact video streams.

At the compaction process, based on the identification of the first set of video segments and the second set of video segments that do not contain the trip information of the people in each of the video streams, the present invention compacts each of the video streams by removing the second set of video segments from each of the video streams. This process results in compact video streams 145 that are composed of only the first set of video segments, i.e., trip video segments. The trip video segments are serialized in the compact video streams.

The compact video streams 145 are saved in a data storage, e.g., "database 1" 641. The timestamps, starting frame, and ending frame of each of the trip video segments are also stored in a database for future reference. FIG. 5 shows an exemplary data structure that stores the information for each of the trip video segments. The processes are synchronized 245 with a time server, and the timestamps are measured.

Figure 12:
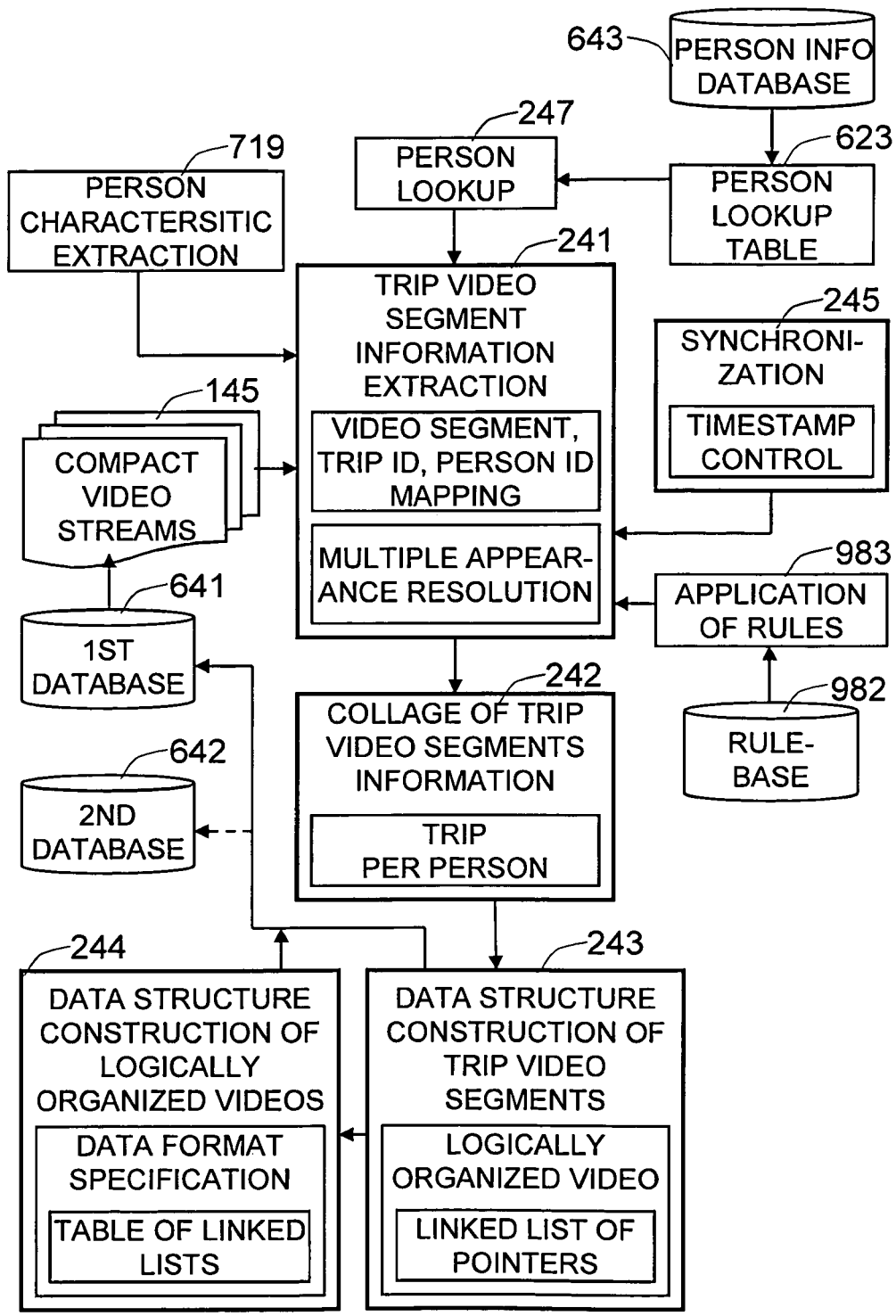
FIG. 12 shows exemplary processes of constructing a data structure for logically organized videos and a data structure for trip video segments in the present invention.

FIG. 12 shows exemplary processes of constructing a "data structure for logically-organized videos" 244 and a "data structure for trip video segments" 243 in the present invention.

When a person of interest is found 247 in a pool of persons, represented by an exemplary person lookup table 623 from a person information database 643, in relation to the person's tracking, a module for trip video segment information extraction 241 finds the relevant sequence of trip video segments in the compact video streams and maps the person's ID and trip ID, along with the sequence of trip video segments. The mapping is aided by the person information in the person information database 243 in association with the trip information in a trip information data structure.

In this process, ambiguities caused by multiple appearances of the person in multiple video segments are also resolved. One exemplary algorithm for the resolution is to choose the earliest video segment where the person appears among the multiple conflicting video segments by comparing their timestamps.

Another exemplary algorithm is to choose a video segment that has the optimal view of the person tracking. The decision whether a video segment has a better view of the person is made based on a set of predefined rules. For example, if the person's position in the video segment is located in a specific area or within a closer proximity to the specific area in the field of view, the video segment can be chosen as the optimal view video segment over others.

The present invention creates a collage of video segments information 242 according to the extracted trip video segments information per person. The collage of video segments information is created and organized in a data structure 243. An exemplary data structure is a linked list of pointers, where the pointers point to the relevant video segments.

The final output of the collage is essentially a logically-organized video for the specific person based on the person's trip information, in the sense that the references to the video segments can be logically organized to fulfill a goal.

Each of these logically organized video streams for the people of interest is accumulated and further organized in a data format, i.e., a data structure construction of logically-organized videos 244. One exemplary data format structure can be a table of linked lists. In this table, each row entry contains a person's logically-organized video, i.e., a linked list of pointers to the relevant video segments for the person's trip among the compact video streams.

The final outputs are stored in a data storage, such as in a first database 641, where the compact video streams are also stored. In another exemplary embodiment, the data can also be stored in a second database 642. In other words, the data storage for the data structure that contains the collages of video segments information can be the same as the data storage of compact video streams, but the data structure can also be stored in a different data storage. Along with the compact video streams 145, these data structures are part of the VIDEORE format:

The stored trip video segments in the compact video streams 145 can be retrieved at the later playback process using the information in the data structures. For example, playback software can follow the pointers in the linked list and play the video segments in serial.

Rule Application Logic Module

The trip video segment information extraction process can be further facilitated by applying 983 a set of predefined rules in a rule base 982 through a rule application logic module. The rule application logic module can enable a dynamic rule application rather than relying on an ad hoc solution or static hard code in extracting the video segments.

An exemplary rule application logic module can be implemented utilizing the information unit verification technologies in U.S. Pat. No. 7,904,477 of Jung, et al. (hereinafter Jung).

The rule application logic module enables the adjustment in the extraction to be done in a structured and dynamic way. The mapping of a video segment to the trip ID, person ID, and multiple appearance resolution can be dynamically adjusted based on the rule application logic module.

In an exemplary embodiment, the rule application logic module constructs an extraction criteria based on a set of predefined rules. The rule application logic module can further construct the criteria based on a combination of a set of predefined rules in which the extraction can be performed in further detail.

The application of the rule application logic module can differentiate the levels of extraction, where a first set of criteria is applied to all of the track segments in a video segment, and a second set of criteria is applied to a specific track segment. An exemplary first set of criteria can typically comprise common criteria throughout all of the track segments, and the second set of criteria is typically different from the first set of criteria.

Figure 13:
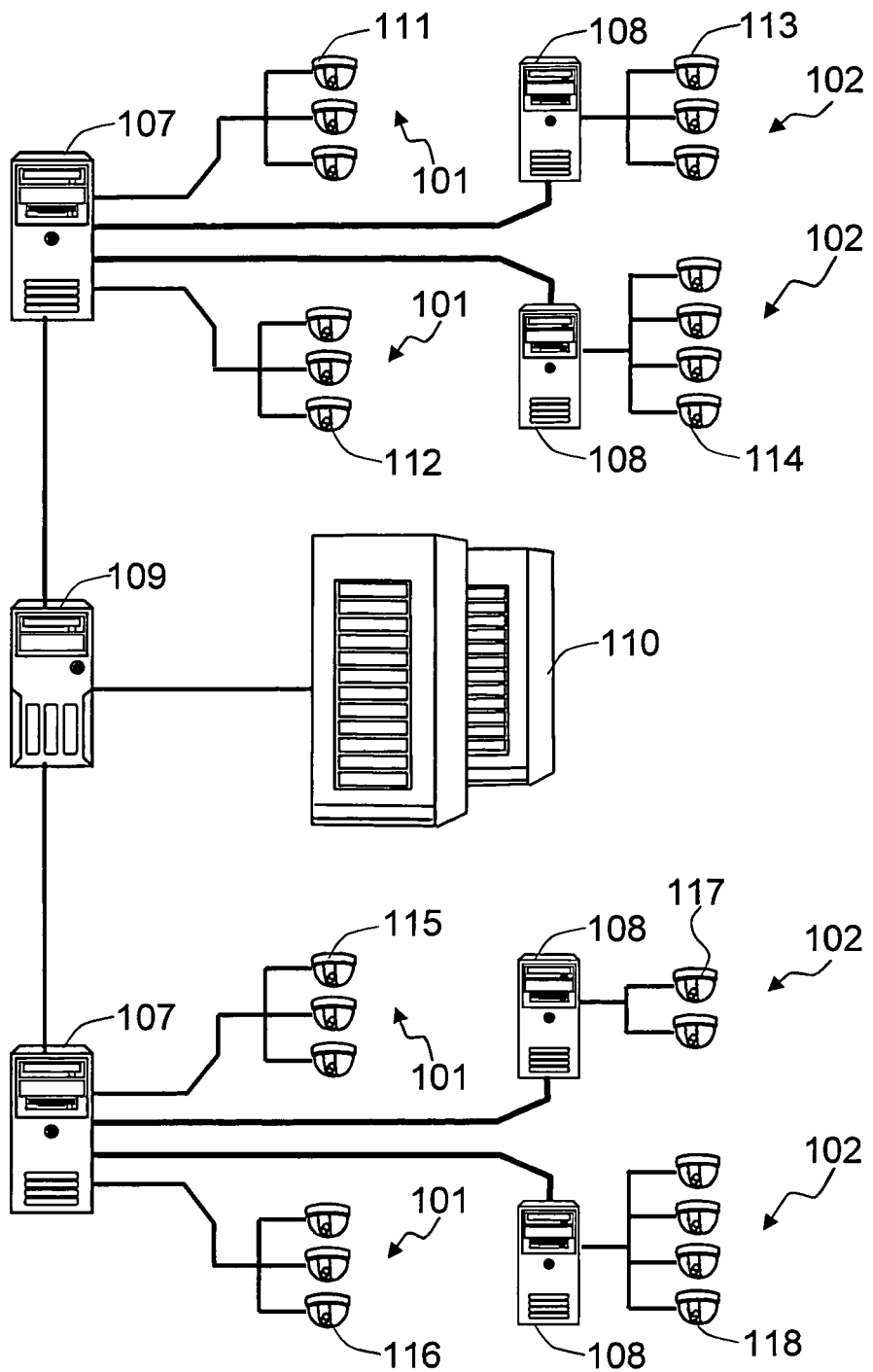
FIG. 13 shows an exemplary network of a plurality of means for control and processing and a plurality of means for capturing images that capture a plurality of video streams in the present invention.

FIG. 13 shows an exemplary network of a plurality of means for control and processing and a plurality of means for capturing images that capture a plurality of video streams in the present invention.

The network consists of a plurality of first means for control and processing 107 and a plurality of second means for control and processing 108, which communicate with each other to synchronize the timestamped lists of measurements among a plurality of video streams captured by the means for capturing images in the measured locations.

In the exemplary embodiment, a plurality of means for capturing images, i.e., a plurality of first means for capturing images 101, are connected to the means for video interface in a first means for control and processing 107.

If the distance between the plurality of means for capturing images is greater than a means for control and processing can handle, e.g., in order to cover the entire trip of a person in multiple areas, the plurality of means for capturing images can be connected to multiple means for video interface.

For example, in the exemplary embodiment shown in FIG. 13, a plurality of first means for capturing images 101, such as a "means for capturing images 1" 111 and a "means for capturing images 2" 112, are connected to the means for video interface in a first means for control and processing 107 that is different from the first means for control and processing 107 of another plurality of first means for capturing images 101, such as a "means for capturing images 5" 115 and a "means for capturing images 6" 116. The plurality of means for control and processing can be connected in a local area network and communicate with each other.

In an exemplary deployment of the system that embodies the present invention, the first means for capturing images 101 can be installed where the field of view can cover the traffic of the people in the measured location, and the second means for capturing images 102 can be installed near a location for the close view and detailed behavior analysis of the people. The means for capturing images are connected to the means for video interface through cables.

The digitized video data from the means for video interface is transferred to the means for control and processing that executes computer vision algorithms on the data. The means for control and processing can have internal means for storing data or external means for storing data 110.

The means for storing data 110 can be used to host the first database 641, the second database 642, and other data processed by the present invention.

The means for capturing images can comprise an analog camera, USB camera, or Firewire camera. The means for video interface, which can comprise a video frame grabber, USB interface, or Firewire interface, are typically included in the same enclosure as the means for control and processing. The means for control and processing can be a general purpose personal computer, such as a Pentium 4 PC, or a dedicated hardware that can carry out the required computation. The means for control and processing, as well as the means for video interface, can be placed locally or remotely, as long as the connection to the means for capturing images can be established. The internal means for storing data, such as internal hard disk drives, is placed within the same enclosure as the means for control and processing. The external means for storing data, such as a network storage driver or internal hard disk drives contained in a remote data storage server, can be placed locally or remotely, as long as a means for transferring data is available.

The present invention can generate timestamped measurements for the video streams and the video segments, in accordance with the behavior analysis, utilizing a time server 109. The exemplary time server 109 can maintain a synchronized time in the network of means for control and processing. In another exemplary embodiment, a first means for control and processing 107 can act as a server, and a plurality of second means for control and processing 108 can act as clients. The server can run its own local clock or be connected to a global time server 109 for the synchronization utilizing a time synchronization protocol, such as the Network Time Protocol (NTP). The timestamped measurements facilitate the synchronization of the video data and the timestamp values in the data structures used in the present invention.

The number of means for capturing images per a means for control and processing varies, depending on the system configuration in the physical space. However, each means for control and processing knows the location and the identification of each of its associated plurality of means for capturing images and the area covered by the means for capturing images.

While the above description contains much specificity, these should not be construed as limitations on the scope of the invention, but as exemplifications of the presently preferred embodiments thereof. Many other ramifications and variations are possible within the teachings of the invention. Thus, the scope of the invention should be determined by the appended claims and their legal equivalents, and not by the examples given.

What is claimed is:

1. A method for storing videos based on track sequences in video segments for a person or a plurality of persons that visited an area covered by a plurality of cameras that are connected to at least a computer through at least a video interface using computer vision technology, comprising the following steps of:
    a) tracking the person or the plurality of persons in each of a plurality of video streams, producing track sequences, by executing a computer vision based tracking algorithm on the plurality of video streams utilizing the computer,
    b) computing information for the trip of the person or the plurality of persons based on the track sequences,
    c) executing a process in the computer to determine a first set of video segments that contain the trip information of the person or the plurality of persons and a second set of video segments that do not contain the trip information of the person or the plurality of persons in each of the video streams,
    d) executing a process in the computer to compact each of the video streams by removing the second set of video segments from each of the video streams,
    e) executing a process in the computer to associate the first set of video segments with the person or the plurality of persons based on the information for the trip of the person or the plurality of persons, in a data structure, and
    f) creating a trip-centered format that stores the compacted video streams with the first set of video segments based on the track sequences from the plurality of cameras, wherein the format comprises the data structure for associating the first set of video segments with the person or the plurality of persons based on the information for the trip of the person or the plurality of persons, including a table of indices, and
    wherein the stored videos based on track sequences in video segments support re-mining of behavior of the person or the plurality of persons.

2. The method according to claim 1, wherein the method further comprises a step of organizing the associated first set of video segments logically based on at least a rule, wherein the rule comprises a trip-centered video indexing scheme.

3. The method according to claim 1, wherein the method further comprises a step of indexing the first set of video segments for the person or each of the plurality of persons based on the information for the trip of the person or each of the plurality of persons and producing a table of indices,
    wherein the indices point to relevant video segments in the first set of video segments.

4. The method according to claim 1, wherein the method further comprises a step of accessing the compacted video streams and the first set of video segments without a loss of the video segments that contain the trip information.

5. The method according to claim 1, wherein the method further comprises a step of annotating the compacted video streams and the first set of video segments, wherein the annotation facilitates multiple applications dealing with behavior analysis, including areas of human behavior analysis, loss prevention, investigation, security, animal research, medical research, and sociology research.

6. The method according to claim 1, wherein the method further comprises a step of processing a playback of the entire trip of the person or the plurality of persons, using a data structure that contains collages of video segments information, wherein a collage of video segments information is created according to trip video segments information per person.

7. The method according to claim 1, wherein the method further comprises a step of merging the track sequences into one track,
    wherein the trip information of the person or the plurality of persons is calculated based on the track sequences, and
    wherein the trip information includes coordinates for the positions of the person or the plurality of persons, temporal attributes of the track sequences, video stream IDs, video segment IDs, trip IDs, and person IDs for each person.

8. The method according to claim 1, wherein the method further comprises a step of resolving disambiguation of multiple appearances of a person's track sequences among a plurality of video segments in the first set of video segments if the person or the plurality of persons is visible in more than one video segment in the first set of video segments.

9. An apparatus for storing videos based on track sequences in video segments for a person or a plurality of persons that visited an area covered by a plurality of cameras using computer vision technology, comprising:
   a) cameras for capturing a plurality of video streams of the person or the plurality of persons in the area,
   b) at least a video interface,
   c) at least a computer that performs the following steps of:
      tracking the person or the plurality of persons in each of the video streams, producing track sequences, by executing a computer vision based a tracking algorithm on the plurality of video streams,
      computing information for the trip of the person or the plurality of persons based on the track sequences,
      determining a first set of video segments that contain the trip information of the person or the plurality of persons and a second set of video segments that do not contain the trip information of the person or the plurality of persons in each of the video streams,
      compacting each of the video streams by removing the second set of video segments from each of the video streams,
      associating the first set of video segments with the person or the plurality of persons based on the information for the trip of the person or the plurality of persons, in a data structure, and
      creating a trip-centered format that stores the compacted video streams with the first set of video segments based on the track sequences from the plurality of cameras,
      wherein the format comprises the data structure for associating the first set of video segments with the person or the plurality of persons based on the information for the trip of the person or the plurality of persons, including a table of indices, and
      wherein the stored videos based on track sequences in video segments support re-mining of behavior of the person or the plurality of persons.

10. The apparatus according to claim 9, wherein the apparatus further comprises a computer for organizing the associated first set of video segments logically based on at least a rule,
   wherein the rule comprises a trip-centered video indexing scheme.

11. The apparatus according to claim 9, wherein the apparatus further comprises a computer for indexing the first set of video segments for the person or each of the plurality of persons based on the information for the trip of the person or each of the plurality of persons and producing a table of indices,
   wherein the indices point to relevant video segments in the first set of video segments.

12. The apparatus according to claim 9, wherein the apparatus further comprises a computer for accessing the compacted video streams and the first set of video segments without a loss of the video segments that contain the trip information.

13. The apparatus according to claim 9, wherein the apparatus further comprises a computer for annotating the compacted video streams and the first set of video segments,
   wherein the annotation facilitates multiple applications dealing with behavior analysis, including areas of human behavior analysis, loss prevention, investigation, security, animal research, medical research, and sociology research.

14. The apparatus according to claim 9, wherein the apparatus further comprises a computer for processing a playback of the entire trip of the person or the plurality of persons, using a data structure that contains collages of video segments information,
   wherein a collage of video segments information is created according to trip video segments information per person.

15. The apparatus according to claim 9, wherein the apparatus further comprises a computer for merging the track sequences into one track, wherein the trip information of the person or the plurality of persons is calculated based on the track sequences, and
   wherein the trip information includes coordinates for the positions of the person or the plurality of persons, temporal attributes of the track sequences, video stream IDs, video segment IDs, trip IDs, and person IDs for each person.

16. The apparatus according to claim 9, wherein the apparatus further comprises a computer for resolving disambiguation of multiple appearances of a person's track sequences among a plurality of video segments in the first set of video segments if the person or the plurality of persons is visible in more than one video segment in the first set of video segments.

* * * * *